INVENTOR
William K. Sonnemann
ATTORNEY

United States Patent Office 3,214,641
Patented Oct. 26, 1965

3,214,641
PROTECTIVE RELAY DEVICES
William K. Sonnemann, Roselle Park, N.J., assignor to Westinghouse Electric Corporation, East Pittsburgh, Pa., a corporation of Pennsylvania
Filed Jan. 15, 1962, Ser. No. 166,028
11 Claims. (Cl. 317—36)

This invention relates to protective relay devices and it has particular relation to time-delay overcurrent relay devices employing static components.

The protection of electrical systems by protective relay devices is well known. Such devices may respond sub-substantially instantaneously or with time delay to various quantities present in the electrical systems to be protected. Inasmuch as the invention may be described adequately as applied to overcurrent protection of an alternating-current electrical system the following discussion will be directed to such applications.

In a time-delay overcurrent relay device, it is desirable to initiate a timing operation only if the current in an electrical system to be protected equals or exceeds a predetermined value known as a minimum trip value. To this end a reference or threshold device may be employed for initiating the desired timing operation which changes its condition when the current in the electrical system to be protected exceeds a predetermined threshold or reference value.

In accordance with the invention, the minimum trip value is established by deriving a discontinuous quantity from the energization of the relay device.

In a preferred embodiment of the invention, a saturable transformer has its primary winding energized in accordance with the current of the electrical system to be protected. When the transformer saturates a discontinuity appears in the form of harmonics of the fundamental frequency. One or more of these harmonics may be employed for controlling the initiation of a timing operation. Thus, the selected harmonic may be rectified and the rectified quantity may be employed directly to charge a timing capacitor. Alternatively, the harmonic quantity may be employed for triggering the charging of the capacitor from another source of energy.

It is also desirable to ascertain accurately the completion of a timing operation. To this end, a reference or threshold device may be employed. When the voltage across the timing capacitor exceeds the value determined by the reference or threshold device, the timing operation is completed.

In accordance with the invention, a common reference device may be employed for determining both the minimum trip value and the completion of a timing operation. The invention also contemplates the derivation of a constant quantity from the energization of the relay device. This constant quantity may be employed as a reference.

If the condition initiating a timing operation disappears before completion of the timing operation, it is desirable that the relay device reset promptly. In accordance with the invention, a controllable switch may be employed for shunting the timing capacitor. This controllable switch may be controlled by the direction of current flow relative to the timing capacitor to discharge the capacitor promptly when the relay device is to be reset. Alternatively, the controllable switch may be controlled by both the direction of current flow relative to the timing capacitor and by a change in magnitude of such current.

In accordance with the further aspect of the invention when the timing operation is initiated the timing capacitor is connected for energization from a source of constant voltage. The voltage across the timing capacitor then is compared with a variable reference quantity.

It is therefore an object of the invention to provide an improved time-delay overcurrent relay device.

It is a further object of the invention to provide a time-delay protective relay device wherein a timing operation is dependent on harmonic production from energization derived from an electrical system to be protected.

It is also an object of the invention to provide a time-delay protective relay device wherein the initiation and completion of a timing operation are both determined by a common reference device.

It is still another object of the invention to provide a time-delay protective relay device with improved means for resetting the device.

It is an additional object of the invention to provide a protective time-delay relay device wherein a timing capacitor is charged from a source of constant voltage and wherein the voltage across the capacitor is compared with a variable reference voltage.

Other objects of the invention will be apparent from the following description taken in conjunction with the accompanying drawings, in which.

Figure 1:
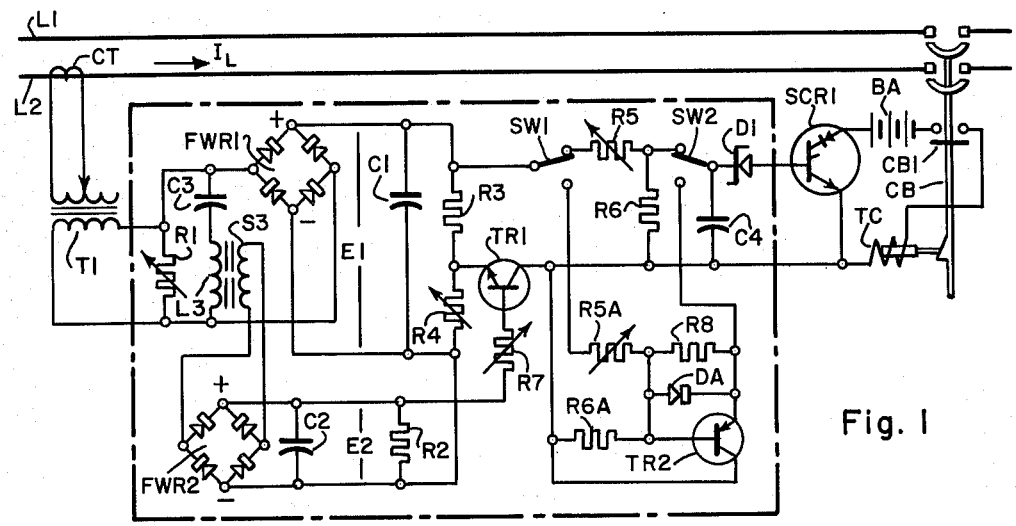
FIGURE 1 is a schematic view of a protective relay device embodying the invention and associated with an electrical system.

Referring to the drawings, FIGURE 1 shows a protective relay device associated with a line conductor L2 of an electrical system to be protected. This system may be of any desired type. It may be a single-phase or a polyphase system. For present purposes, it will be assumed that the system is a single-phase alternating-current system represented by line conductors L1 and L2 and designed for operation at a frequency of 60 cycles per second.

A circuit breaker CB is provided for segregating portions of the electrical system under fault conditions. This circuit breaker includes a switch CB1 which is closed when the circuit breaker is closed and which is opened when the circuit breaker is opened. The circuit breaker also includes a trip coil TC. Energization of the trip coil TC while the circuit breaker CB is closed results in a tripping operation of the circuit breaker.

In the protective relay device a direct voltage E1 is derived from some quantity present in the electrical system to be protected and is applied across a voltage divider represented by a fixed resistor R3 and an adjustable resistor R4. In the preferred embodiment of FIGURE 1, the voltage E1 is derived from the line current $I_L$ flowing through the line conductor L2.

In order to energize the protective relay device, a current transformer CT has its primary winding energized in accordance with the line current $I_L$. The secondary winding of the current transformer is connected across the primary winding of the transformer T1 which has an iron core. For calibration purposes, the primary winding of the transformer T1 preferably has an adjustable tap to permit adjustment of the effective number of turns of the winding.

The secondary winding of the transformer T1 is connected across an adjustable load resistor R1 and across the input terminals of a full-wave rectifier FWR1 which conveniently may be of the bridge type as illustrated.

The output terminals of the rectifier FWR1 have polarities shown by conventional polarity markings and are connected across a filter capacitor C1 and across the voltage divider represented by the resistors R3 and R4 in series to provide the voltage E1 thereacross.

The voltage appearing across a portion of the voltage divider represented by the resistor R3 is employed for charging a capacitor C4 through two switches SW1 and SW2 and through a controllable switch TR1. For present purposes, it will be assumed that the switches SW1 and SW2 are single-pole double-throw switches positioned as shown in FIGURE 1. With the switches SW1 and SW2 in the positions illustrated in FIGURE 1, the charging circuit for the capacitor C4 also includes an adjustable resistor R5. The resistor R5 may be adjusted for the purpose of adjusting the charging rate of the capacitor C4. A resistor R6 connected across the capacitor C4 through the switch SW2 assists in discharging the capacitor rapidly when the voltage across the resistor R3 decreases to a value below the voltage across the capacitor C4.

It is desirable that charging of the capacitor C4 be initiated only when the line current $I_L$ reaches a predetermined reference or threshold value. For values of line current below the reference value, the switch TR1 is in blocking condition to prevent charging of the capacitor. For values of line current above the reference value, the switch TR1 is closed to permit charging of the capacitor C4.

In a preferred embodiment of the invention, the switch TR1 takes the form of a transistor. This transistor may be of the NPN or PNP type. For present purposes, it will be assumed that the transistor TR1 is an NPN transistor.

In a preferred embodiment of the invention, the switch TR1 is controlled by a discontinuity present in the output of the transformer T1. Such a discontinuity may be obtained by designing the iron core of the transformer T1 to saturate when the line current $I_L$ reaches its reference or threshold value. The specific line current at which the iron core saturates may be adjustable by adjustment of the resistance loading of the secondary winding of the transformer. Although the resistors R3 and R4 represent part of this loading the major adjustment is by the resistor R1.

Saturation of the transformer T1 results in the production of substantial amounts of harmonics. Any of these harmonics may be employed for controlling the switch TR1. In FIGURE 1, one of the harmonics is segregated by connecting a capacitor C3 and an inductance L3 in series across the secondary winding of the transformer T1. This series circuit is designed to be resonant at the frequency of the desired harmonic. Consequently, substantial current of the desired harmonic frequency when present will flow through the inductance L3. The inductance L3 serves as the primary winding of a transformer having a secondary winding S3. Preferably, this transformer is provided with an iron core having an air gap. The secondary winding S3 is connected across the input terminals of a full-wave rectifier FWR2 which is illustrated as a bridge type rectifier. The output terminals of the rectifier are connected across a filter capacitor C2 and across a load resistor R2 to provide a voltage E2 thereacross which is dependent on the selected harmonic output of the transformer T1.

By inspection of FIGURE 1, it will be noted that the voltage E2 is applied across the base and emitter of the transistor TR1 through the resistor R4 and an adjustable resistor R7. The resistor R4 provides a small voltage bias for the emitter circuit of the transistor TR1 which tends to maintain the transistor in its blocking condition. When the voltage E2 appears in a magnitude greater than the voltage across the resistor R4, the resultant voltage in the emitter circuit directs a current therethrough which turns the transistor TR1 on. If the conductivity of the emitter-collector circuit of the transistor TR1 increases as the selected harmonic output of the transformer T1 increases, the charging rate of the capacitor C4 increases in a corresponding manner. Under such circumstances, the charging rate of the capacitor C4 may be adjusted by adjustment of the resistor R7.

A timing operation of the capacitor C4 is completed when the voltage across the capacitor reaches a predetermined reference or threshold value. In the embodiment of FIGURE 1 this value is determined by a device D1 which blocks the flow of current until the voltage thereacross reaches the desired threshold or reference value. The device D1 may take the form of a Zener diode.

When the device D1 breaks down, current supplied therethrough trips the circuit breaker CB. If the current is sufficient in magnitude, it may be applied directly to the trip coil TC. However, in FIGURE 1 a suitable amplifier is provided. Conveniently, the amplifier may comprise a silicon-controlled rectifier SCR1 having its gate and cathode connected across the capacitor C4 through the device D1. The trip coil TC is connected across the cathode and anode of the silicon-controlled rectifier through the switch CB1 and a source of direct current represented by a battery BA.

The operation of the portion of FIGURE 1 thus far described may now be considered. It will be assumed that the circuit breaker CB is closed and that the line current $I_L$ is being supplied through the circuit breaker CB to a load. Through operation of the transformer CT and T1, and the rectifier FWR1, the voltage E1 appears across the resistors R3 and R4. As long as the line current $I_L$ remains within a normal range suitable for the load, the transistor TR1 is in blocking condition and the capacitor C4 cannot be charged. Any charge that may have been placed in the capacitor C4 previously is discharged though the resistor R6.

Let it be assumed that due to a fault adjacent the load, the line current $I_L$ increases to a value sufficient to saturate the transformer T1. Such saturation results in the production of harmonics, one of which, for example the third harmonic, is segregated through the series resonant circuit C3, L3 which is tuned to be resonant at the frequency of such third harmonic. The third harmonic produces a voltage across the secondary winding S3 which is rectified to produce the voltage E2 across the resistor R2.

When the voltage E2 exceeds in magnitude, the voltage across the resistor R4 the transistor TR1 turns on to initiate a charging operation of the capacitor C4. As the line current $I_L$ continues to increase the voltage appearing across the resistor R3 also increases and thus increases the charging rate of the capacitor C4. In addition, the harmonic production of the transformer T1 increases and this increases the voltage E2. An increase in the voltage E2 may increase the conductivity of the emitter-collector circuit of the transistor TR1 to further increase the charging rate of a capacitor C4.

If the fault is cleared before the capacitor C4 charges sufficiently to trip the circuit breaker CB, the line current $I_L$ drops below the value necessary to saturate the transformer T1. As a result of the termination of harmonic production, the voltage E2 drops substantially to zero and the transistor TR1 returns to its blocking condition. The capacitor C4 now discharges through the resistor R6.

Let it be assumed next that, instead of clearing, the fault continues until the capacitor C4 has a voltage thereacross sufficient to break down the Zener diode D1. The resultant flow of current through the Zener diode fires the silicon-controlled rectifier SCR1 to trip the circuit breaker CB. As a result of the tripping of the circuit breaker CB, the line current $I_L$ drops to zero and the harmonic production of the transformer T1 is terminated. The transistor TR1 is restored to its blocking condition and the capacitor C4 discharges through the resistor R6.

This completes the cycle of operation of the protective relay device.

When the capacitor C4 is to be discharged, it is desirable that this discharge take place rapidly. The discharge of the capacitor C4 may be made extremely rapid by operating the switches SW1 and SW2 to their lower positions as viewed in FIGURE 1.

With the switches SW1 and SW2 in their lower position, the voltage appearing across the resistor R3 is applied across the capacitor C4 through the resistors R5A and R8 and the switch TR1. The charging rate of the capacitor may be adjusted by adjustment of the resistor R5A. Across the capacitor C4 a switch TR2 is now connected which is in blocking condition when the capacitor is to be charged and which is in conductive condition when the capacitor is to be rapidly discharged. This switch preferably is in the form of a transistor having its emitter and collector connected respectively to the terminals of the capacitor C4. The emitter and base of the transistor are connected respectively to the terminals of the resistor R8 and of a rectifier DA. A resistor R6A is connected between the base and collector of the transistor.

Let it be assumed that a charging voltage appears across the resistor R3 and that the transistor TR1 is in its conductive condition. A charging current for the capacitor C4 produces a voltage drop across the resistor R8 which is so poled that the base of the transistor TR2 is positive relative to the transistor emitter. Inasmuch as the transistor TR2 is assumed to be a PNP transistor, the voltage drop across the resistor R8 maintains the transistor in its blocking condition and the capacitor consequently is capable of receiving a charge.

If the line current $I_L$ drops below minimum trip value before completion of a timing operation of the capacitor C4, the capacitor starts to discharge through the resistors R8 and R6A in series. The voltage drop across the resistor R8 now maintains the emitter of the transistor TR2 positive with respect to the base and the transistor consequently is placed in conductive condition. The transistor now in effect shunts the capacitor C4 and assures a rapid discharge or resetting of the capacitor.

The rectifier DA prevents the application of a high voltage across the emitter and base of the transistor TR2 while the capacitor C4 is being charged.

In FIGURE 1, two reference or threshold devices or means are employed for the purpose of determining the initiation and completion of a timing operation. The reference device for determining the initiation of a timing operation is responsive to the presence of a harmonic in the output of the transformer T1. The Zener diode D1 is employed as a reference device for the purpose of determining the completion of a timing operation. These two references are provided by a single device in the modification of FIGURE 2.

Figure 2:
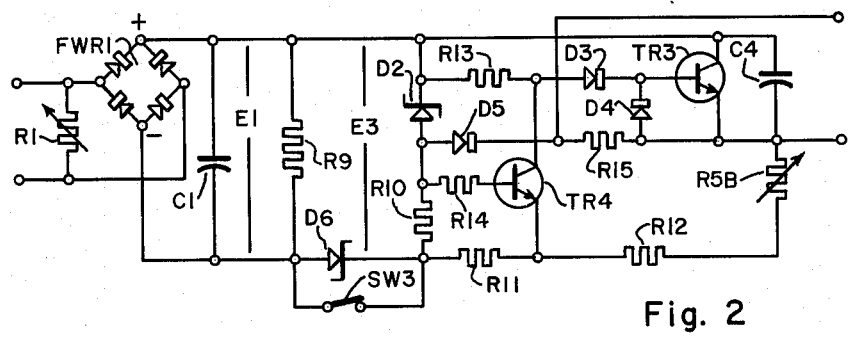
FIG. 2 is a schematic view showing a modified protective relay device.

FIGURE 2 shows circuits which are intended to replace the circuits enclosed in the broken line box of FIGURE 1. It will be noted that the resistor R1, the full wave rectifier FWR1 and the capacitor C1 are employed for producing the direct voltage E1 which is dependent on the line current $I_L$. For present purposes, it will be assumed that the switch SW3 is in closed condition. With this assumption the direct voltage E1 is applied directly across a load resistor R9 and across a circuit including in series a reference device D2 and a resistor R10.

The reference device D2 for low applied voltage is in a blocking condition. When the applied voltage reaches a predetermined reference or threshold value, the device D2 becomes conductive and permits a substantial current to flow through the resistor R10. Under these circumstances, a substantially constant voltage drop appears across the device D2. A Zener diode has characteristics of this nature and will be assumed to be employed as the device D2.

The voltage E1 also is applied across the capacitor C4 in FIGURE 2 through the switch SW3, a resistor R11, a resistor R12 and a resistor R5B which has an adjustable value of resistance. By adjustment of the resistor R5B, the charging rate of the capacitor C4 can be adjusted.

In order to reset the capacitor C4, a transistor TR3, assumed to be of the NPN type, has its collector and emitter connected respectively to the terminals of the capacitor C4. The collector of the transistor TR3 also is connected to the transistor base through a resistor R13 and a rectifier D3. A rectifier D4 is connected across the emitter and base of the transistor TR3 to prevent applications of injurious voltages to the base emitter junction when the transistor is in blocking condition.

The transistor TR3 is controlled in part by an additional transistor TR4 which also is assumed to be of the NPN type. The collector of the transistor TR4 is connected to the collector of the transistor TR3 through the resistor R13. As shown, the emitter of the transistor TR4 is connected to a point intermediate the resistors R11 and R12. The voltage appearing across a resistor R10 is applied across the base and emitter of the transistor TR4 through a resistor R14 and the resistor R11. The voltage appearing across the resistor R15 is employed for operating the silicon controlled rectifier SCR1 of FIG. 1. The circuit for the resistor R15 may be traced from a point intermediate the diode D2 and the resistor R10 through a rectifier D5 and the resistor R15 to a point intermediate the capacitor C4 and the resistor R5B.

The operation of the embodiment represented in FIGURE 2 now will be considered. It will be assumed that the circuit breaker CB is closed and that a line current $I_L$ is flowing which is below the minimum trip value. Under these circumstances the voltage E1 is insufficient to break down the Zener diode D2. Inasmuch as the diode D2 under these conditions permits the flow of virtually no current the transistor TR4 is in its blocking condition.

It will be noted that the rectifier FWR1 supplies current to the base-emitter circuit of the transistor TR3. This circuit may be traced from the positive terminal of the rectifier FWR1 through the resistor R13, the diode D3, the base and emitter of the transistor TR3, the resistors R5B, R12 and R11 and the switch SW3 to the negative terminal of the rectifier FWR1. The transistor TR3 thus is in conductive condition and assures a discharged condition of the capacitor C4.

As the line current $I_L$ increases the direct voltage E1 reaches a threshold or reference value sufficient to break down the Zener diode D2. Current now flows through the diode D2 and the resistor R10.

The direct voltage appearing across the resistor R10 directs current through the resistor R14, the base and emitter of the transistor TR4 and the resistor R11 to turn on the transistor TR4. This places the right-hand end of the resistor R13 substantially at the negative potential of the rectifier FWR1 and the transistor TR3 now is in blocking condition. Consequently, the capacitor C4 now starts to charge.

It will be recalled that a substantially constant voltage appears across the diode D2 following its breakdown. During the initial stage of the charging of the capacitor C4, the right hand terminal of the diode D5 is more positive than the left hand terminal. Consequently, the rectifier blocks the flow of current through the resistor R15. As the capacitor C4 charges, its lower terminal becomes more negative. When the voltage across the capacitor C4 increases above the voltage across the diode D2, current flows through the rectifier D5 and the resistor R15. The resultant voltage drop across the resistor R15 turns on the silicon controlled rectifier SCR1 of FIG. 1 to trip the circuit breaker CB. Consequently, the voltage drop across the diode D2 has served as a second reference or threshold value at which the timing operation is completed.

It will be noted that the switch SW3 is connected across a diode D6 which may be of the type which maintains a constant voltage thereacross after its breakdown. Thus the diode D6 may be a Zener diode. If the switch SW3 is opened, the diode D6 becomes effective and blocks the flow of current thereacross until the voltage supplied to the diode becomes sufficient to cause breakdown of the diode. Thereafter the voltage drop across the diode is subtracted from the direct voltage E1.

Figure 3:
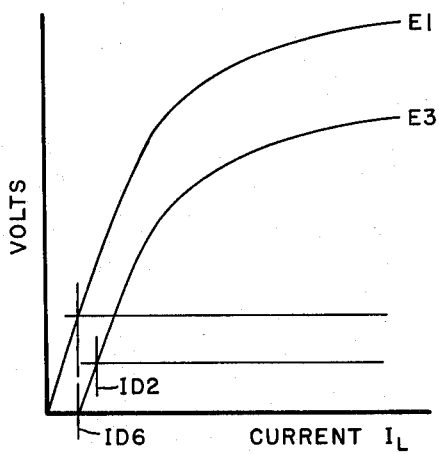
FIG. 3 is a graphical representation showing certain relations between voltage and current in the protective relay device of FIGURE 2.

The operation of the embodiment of FIGURE 2 with the switch SW3 opened may be understood more fully by a consideration of FIGURE 3. In FIGURE 3 ordinates represent values of voltage and abscissas represent values of line current $I_L$. If the transformer T1 has a saturating characteristic, the voltage E1 may have a shape similar to that shown by the curve E1 in FIGURE 3. Inasmuch as the voltage drop across the diode D6 is subtracted from the voltage E1 the voltage E3 applied across the diode D2 and the resistor R10 in series may have a shape similar to that shown by the curve E3 in FIGURE 3.

As the line current $I_L$ increases from zero, the voltage E1 increases along the curve E1 until a value of line current ID6 is reached. Such a current is sufficient to break down the Zener diode D6. As the line current $I_L$ continues to increase, the voltage E3 increases from zero along the curve E3 until a line current having a value ID2 is reached. This value of current is sufficient to produce a voltage E3 which breaks down the Zener diode D2 for the purpose of initiating a charging operation of the capacitor C4 in the manner previously described.

The offset characteristic of the curve E3 in FIGURE 3 is desirable for a number of relay applications. It is readily obtained by the addition of the Zener diode D6.

Figure 4:
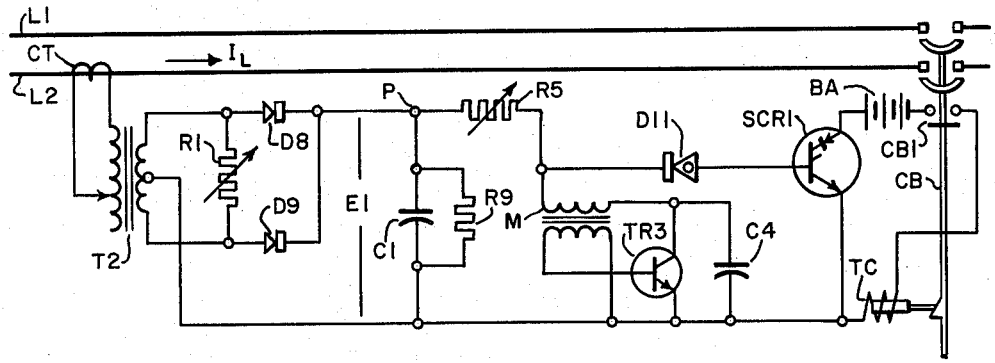
FIGS. 4, 5 and 8 are schematic representations showing various modifications of protective relay devices embodying the invention.

In the embodiment of FIGURE 4, the circuit breaker CB again is employed for the purpose of sectionalizing the line conductors L1 and L2. Tripping of the circuit breaker is accomplished by turning on or firing the silicon controlled rectifier SCR1 to supply current from the battery BA to the trip coil TC through the controlled rectifier and the switch CB1.

A direct voltage E1 is applied across the capacitor C1 and the resistor R9. This direct voltage may be derived from the line current $I_L$ in the manner previously described. However, in FIGURE 4 a somewhat modified system is disclosed for deriving the voltage E1.

In FIGURE 4, the current transformer CT again is energized in accordance with the line current $I_L$ and has its secondary winding connected across the adjustably tapped primary winding of a transformer T2. This transformer has a center tapped secondary winding the center tap being connected to the negative terminal N of the capacitor C1. The two terminals of the secondary winding of the transformer T2 are connected respectively through half wave rectifiers D8 and D9 to the positive terminal P of the capacitor C1. The rectifiers D8 and D9 are poled to supply current from the terminals of the secondary winding to the positive terminal P. The adjustable load resistor R1 is connected across the terminals of the secondary winding and may be adjusted to control the value of line current $I_L$ at which saturation of the iron core of the transformer occurs.

The voltage E1 is employed for charging the capacitor C4. This capacitor again is reset through the emitter collector circuit of the transistor TR3. However, the control of this transistor in FIGURE 4 is somewhat different from the control previously described.

The control of the transistor TR3 is effected through a mutual reactor M having a primary winding and a secondary winding. The mutual reactor may be provided with an iron core having an air gap to prevent saturation of the core within the operating range of the mutual reactor.

By inspection of FIGURE 4, it will be noted that the voltage E1 is connected across the capacitor C4 through a circuit which may be traced from the positive terminal P through the adjustable resistor R5, the primary winding of the mutual reactor M and the capacitor C4 to the negative terminal N. The voltage across the capacitor C4 is applied across the gate and cathode of the silicon controlled rectifier SCR1 through the primary winding of the mutual reactor and a reference or threshold device D11. The secondary winding of the mutual reactor M is connected across the base and emitter of the transistor TR3 for the purpose of turning the transistor on and off.

The reference device D11 preferably blocks the flow of current therethrough until the voltage thereacross exceeds a predetermined breakover value. The device thereafter remains turned on with the voltage thereacross at a reduced value until the current therethrough falls below a small holding value. Such a device is referred to as a four-layer diode or a switching diode and also is available under the tradename Dynistor as described on pages 62 and 63 of Electrons for February 27, 1959, published by McGraw-Hill Company, New York city.

To describe the operation of the system shown in FIGURE 4, it will be assumed that the circuit breaker CB is closed and that a constant value of line current $I_L$ flows which is below the value for which tripping is desired. Because of the voltage E1 across the terminals P and N, the capacitor C4 is charged. However, the voltage across the capacitor C4 is insufficient to break down the diode D11.

Next it will be assumed that a fault occurs which causes the line current $I_L$ to increase to a value sufficient to trip the circuit breaker CB. As the line current $I_L$ increases, the voltage E1 also increases. Consequently, a current flows through the resistor R5 and the primary winding of the mutual reactor M for the purpose of increasing the charge in the capacitor C4. The increase in current flow through the primary winding of the mutual reactor induces a voltage in the secondary winding of the mutual reactor which is properly poled to force current through the base-emitter circuit of the transistor TR3. Inasmuch as the transistor TR3 now is in its conductive condition, it effectively shunts the capacitor C4 and rapidly discharges the capacitor.

In a very short time, the current through the primary winding of the mutual reactor M reaches a steady state value and the voltage induced in the secondary winding of the mutual reactor drops to zero. This turns the transistor TR3 off and the capacitor C4 starts to charge for the purpose of measuring a time interval.

The voltage across the capacitor C4 continues to increase until it reaches a value sufficient to break down diode D11. The capacitor now supplies current through the primary winding of the mutual reactor M and the diode D11 to the gate-cathode circuit of the silicon controlled rectifier SCR1. The silicon controlled rectifier now fires to trip the circuit breaker CB.

When the diode D11 breaks down, the current supplied from the capacitor C4 through the primary winding of the mutual reactor M induces a voltage in the secondary winding of the mutual reactor which is properly poled to maintain the transistor TR3 in blocking condition.

From the foregoing discussion, it is clear that the mutual reactor M operates through the transistor TR3 to discharge or reset the capacitor C4 immediately before it is to start a time interval measurement.

Figure 5:
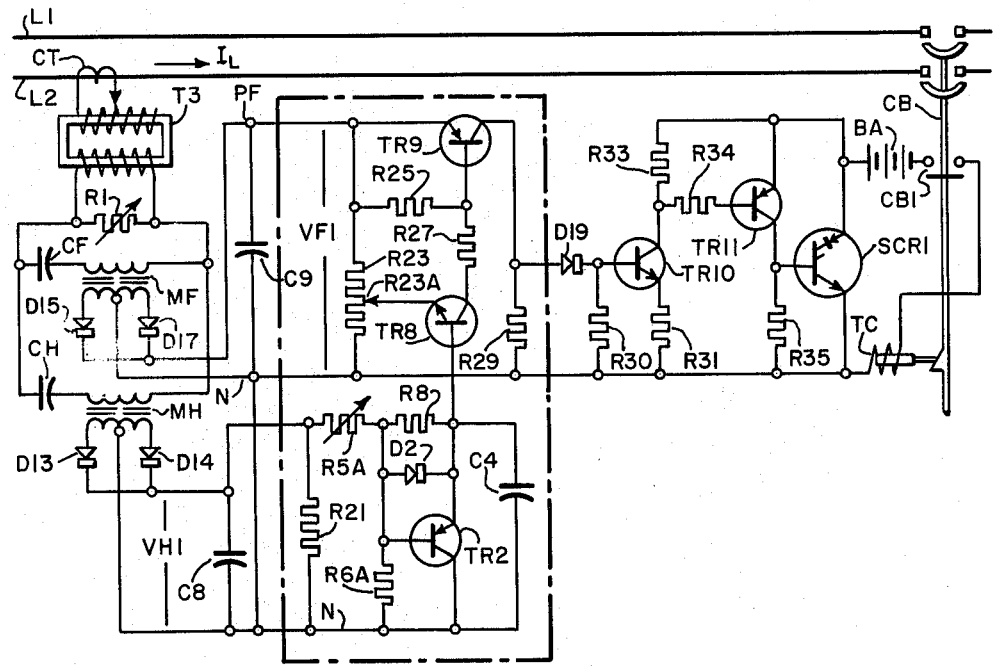

In the embodiment of FIGURE 1, a harmonic such as the third harmonic produced by the saturating transformer T1 was employed for the purpose of initiating a timing operation. In the embodiment of FIGURE 2, a reference or threshold device in the form of a Zener diode D2 was employed for initiating a timing operation. In the embodiment of FIGURE 4, a change in magnitude of the line current was employed for initiating a timing operation. In the embodiment of FIGURE 5, a harmonic output of a saturating transformer T3 is employed as a source of energy for charging a capacitor employed for a timing operation. Consequently, the presence of the harmonic output is sufficient to initiate a timing operation.

In the embodiments of FIGURES 1 and 4, a reference or threshold device was employed for determining the completion of a timing operation. This was based on the break down of a device which may take the form of a Zener diode. In FIGURE 2, the voltage drop across a reference device such as a Zener diode D2 was employed in determining the completion of a timing operation. In FIGURE 5, the magnitude of a component of the output of the transformer T3 such as the fundamental component is employed as a reference for the purpose of determining the completion of a timing operation.

In FIGURE 5, the circuit breaker CB is employed again for sectionalizing the line conductors L1 and L2. The silicon controlled rectifier SCR1 is illustrated for completing a tripping circuit for the trip coil TC through the switch CB1.

The secondary winding of the current transformer CT is employed for energizing the tapped primary winding of a transformer T3. The ampere turns of this winding may be adjusted by manipulation of the adjustable tap. Although the secondary winding of the transformer T3 may be located on the same leg with the primary winding preferably the secondary winding is located on a separate leg as illustrated. This minimizes the air coupling between the primary and secondary windings.

Although the saturation iron core of the transformer T3 need not be constructed of square loop hysteresis material, it is helpful to assume that such square loop material is employed for the purpose of explaining the operation of FIGURE 5.

Let it be assumed that the maximum magnitudes of flux in the magnetic core for each polarity are slightly less than the values required to saturate the magnetic core. Under such circumstances for a sine wave input to the primary winding a sine wave voltage is developed across the adjustable load resistor R1. This resistor may be adjusted for the purpose of adjusting the saturation point of the transformer and it also provides a path for harmonics which are not employed for control purposes.

Figure 6:
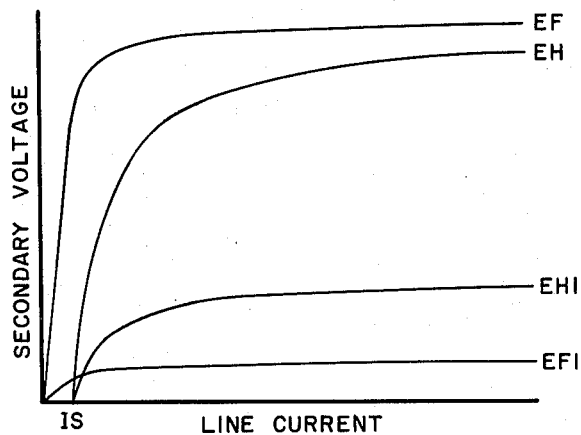
FIGS. 6 and 7 are graphical representations showing relations between voltage and current and useful in explaining the invention.

In FIGURE 6, the curves represent fundamental and harmonic voltages appearing across the resistor R1. Ordinates represent average values of secondary voltage and abscissas represent values of the line current $I_L$.

It will be noted that the magnetic core starts to saturate for a value of line current IS. Saturation rapidly limits the rate of increase of secondary voltage relative to line current of the fundamental frequency represented by the curve EF. It will be recalled that the fundamental frequency is assumed to be 60 cycles per second.

As the iron core saturates, harmonics appear in the output of the secondary winding and one such harmonic, assumed to be the third harmonic, is represented by the curve EH.

In FIGURE 6, the curve EF1 represents the curve EF plotted on a different scale of secondary voltage. As will be pointed out below, the curve EF1 is employed as a reference or threshold to determine completion of a timing operation.

The curve EH1 in FIGURE 6 represents a multiple of the curve EH plotted on the scale employed for the curve EF1. It will be assumed that each ordinate value of the curve EH1 has 3.5 times the value of the corresponding ordinates for the curve EH. Any other multiple of the curve EH may be employed as desired.

The voltage appearing across the resistor R1 is applied across two series resonant circuits. One circuit includes the capacitor CH and the primary of the mutual reactor MH. The capacitor CH and the inductance introduced by the primary winding of the mutual reactor MH are proportioned to be resonant at the desired harmonic frequency, for present purposes assumed to be the third-harmonic frequency. The capacitor CF and the inductance introduced by the primary winding of the mutual reactor MF are proportioned to be resonant at the fundamental frequency which is assumed to be 60 cycles per second. Thus, the two resonant circuits are employed for segregating the harmonic and fundamental frequencies.

A direct voltage derived from the secondary winding of the mutual reactor MH is applied across a capacitor C8 and across a load resistor R21. To this end, a center tap of the secondary winding of the mutual reactor MH is connected to the negative terminal of the capacitor C8. The terminals of the secondary winding are connected to the positive terminal of the capacitor C8 respectively through half wave rectifiers D13 and D14. Both of these rectifiers are poled to supply current from the respective terminals of the secondary winding to the positive terminal PH of the capacitor C8.

The voltage VH1 appearing across the capacitor C8 is employed for charging the capacitor C4 through the adjustable resistor R5A and the fixed resistor R8. The resetting of the capacitor C4 is effected by the transistor TR2 in the manner discussed with reference to FIGURE 1.

A direct voltage VF1 across the capacitor C9 is derived from the secondary winding of the mutual reactor MF. To this end, a center tap on the secondary winding of the mutual reactor MF is connected to the negative terminal of the capacitor C9. The two terminals of the secondary winding are connected respectively through half wave rectifiers D15 and D17 to the positive terminal PF of the capacitor. The rectifiers are poled to conduct current from the respective secondary winding terminals in the direction of the positive terminal PF. A load resistor R23 is connected across the terminals PF and N for energization by the voltage VF1.

A portion of the voltage drop across the resistor R23 is employed as a reference or threshold to determine completion of a timing operation. This voltage appears between the tap R23A and the negative terminal N and corresponds to the alternating voltage EF1 of FIGURE 6.

It will be noted that the difference between the voltage appearing between the tap R23A and the negative terminal N and the voltage across the capacitor C4 is applied across the base and emitter of the transistor TR8. As long as the voltage across the capacitor C4 is the smaller of the two voltages, the transistor TR8 is in a blocking condition. The transistor is assumed to be an NPN type transistor. However, when the voltage across the capacitor C4 becomes the larger of the two voltages current flows in the base-emitter circuit of the transistor to turn the transistor on. This initiates a tripping operation of the circuit breaker CB in any desired manner.

In the specific embodiment of FIGURE 5 when the transistor TR8 is turned on, current flows from the positive terminal PF through a resistor R25, a resistor R27, the collector-emitter circuit of the transistor TR8 and the lower portion of the resistor R23 to the negative terminal N. The voltage drop across the transistor R25 is in the proper direction to turn on a transistor TR9 which is assumed to be of the PNP type. Consequently, current now flows from the positive terminal PF through the emitter-collector circuit of the transistor TR9 and the resistor R29 to the negative terminal N.

The voltage drop across the resistor R29 is applied through the rectifier D19 across a resistor R30 and also across the base-emitter circuit of a transistor TR10 through a resistor R31. The transistor TR10 is assumed to be of the NPN type. Current now flows from the positive terminal of the battery BA through the resistor R33, the base-emitter circuit of the transistor TR10, the resistor R31, the trip coil TC and the switch CB1 to the negative terminal of the battery BA. However, this current is insufficient in magnitude to operate the trip coil TC to trip the circuit breaker CB.

The voltage drop across the resistor R33 is applied through a resistor R34 across the base-emitter circuit of a transistor TR11 which is assumed to be of the PNP type. This transistor now turns on and current flows from the positive terminal of the battery BA through the emitter-collector circuit of the transistor TR11, the resistor R35, the trip coil TC and the switch CB1 to the negative terminal of the battery BA. It is assumed that this current is insufficient to operate the trip coil TC for the purpose of tripping the circuit breaker CB.

The voltage drop across the resistor R35 is applied across the gate and cathode of the silicon controlled rectifier SCR1. This controlled rectifier now operates to trip the circuit breaker CB in the manner previously described.

The transistors TR9, TR10 and TR11 may be replaced by any conventional amplifying means suitable for amplifying the output of the transistor TR 8 sufficiently to assure operation of the silicon controlled rectifier SCR1.

From this brief consideration of FIGURE 5, it is clear that the initiation and completion of the timing operation are determined completely by the curves EH1 and EF1. No additional reference or threshold devices are required for such determination. Tripping cannot occur below the value IS of line current at which saturation of the iron core of the transformer T3 occurs to produce the harmonic output represented by the curve EH1. Actually, the minimum trip value of line current is that represented by the intersection of the curves EH1 and EF1. Because of the steep rise of the curve EH1 this value actually is only slightly above the value IS at which saturation of the iron core of the transformer T3 starts.

It will be noted that the reference voltage represented by the curve EF1 is not quite constant over the operating range of the system. However, for any value of line current a definite value of voltage is indicated by the curve EF1 which is suitable for reference purposes.

The voltage represented by the curve EH1 and the difference between the curves EH1 and EF1 increase appreciably as the line current increases above that value corresponding to the intersection of the curves. Therefore, the relay device FIGURE 5 provides the inverse time characteristic desired for relaying purposes.

In the embodiments of the invention thus far described, the voltage employed for charging the timing capacitor is a variable voltage which increases as the line current increases over a substantial range of operation of the system. In the embodiment of FIGURE 8, the timing capacitor is charged by means of a voltage which is relatively constant over a major part of the operating range of the system. The voltage across the capacitor is compared with a reference or threshold voltage which decreases as the line current increases over a substantial range of operation of the system. The desired relationship of the voltage is shown graphically in FIGURE 7 wherein ordinates represent average values of secondary voltage and abscissas represent values of line current.

Figure 7:
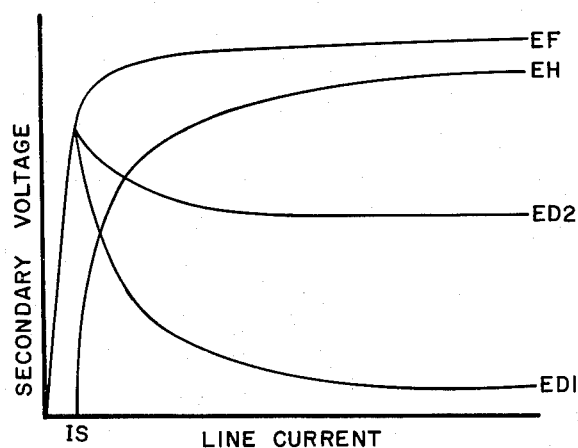
Figure 8:
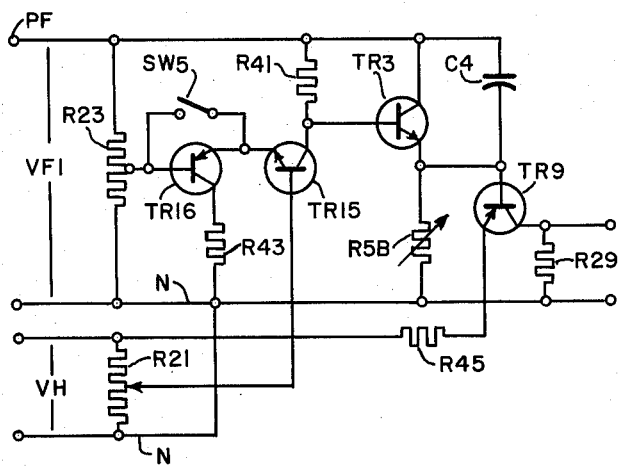

In FIGURE 7 the curve EF of FIGURE 6 is reproduced. This curve has a substantial portion which is almost constant over a substantial range of the line current. The extent of the knee portion of the curve may be limited appreciably by selection of a good square loop hysteresis material for the core of the transformer T3. Consequently, if a voltage corresponding to that represented by the curve EF is employed for charging the timing capacitor, the charging voltage is substantially constant over a substantial range of variation of line current.

In FIGURE 7, the curve ED1 represents the difference between the curves EF and EH of FIGURE 6. If voltages similar to those represented by the curve ED1 are employed as reference or threshold voltages for determining the completion of a timing operation of the timing capacitor, a suitable inverse time characteristic is obtained.

Other configurations of the reference voltage readily may be obtained. Thus, in FIGURE 7 the curve ED2 represents the difference between the voltages represented by the curve EF of FIGURE 6 and one-half of the voltages represented by the curve EH in FIGURE 6.

The circuits shown in FIGURE 8 are intended to replace the circuits of FIGURE 5 which are enclosed within a broken line box. It will be assumed for present purposes that the voltage VF1 across the resistor R23 in FIGURE 8 corresponds to the voltage EF of FIGURE 6 and that the voltage VH appearing across the resistor R21 of FIGURE 8 corresponds to the voltage EH of FIGURE 6.

The timing capacitor C4, the resetting transistor TR3 and the charging resistor R5B of FIGURE 2 are reproduced in FIGURE 8. However, the control of the transistor TR3 is somewhat different in the system of FIGURE 8.

When the line current is below the value for which the circuit breaker CB is intended to be tripped, current is supplied from the positive terminal PF through the resistor R41, the base-emitter circuit of the transistor TR3 and the resistor R5B to the negative terminal N. This current places the transistor TR3 in a conducting condition and the capacitor C4 consequently is discharged.

When the line current rises above the value IS in FIGURE 7 into the circuit breaker tripping range, the transformer T3 saturates and produces a harmonic output which in turn results in the presence of a substantial voltage VH across the resistor R21. A portion of this voltage is employed to turn on an NPN transistor TR15 through a circuit which may be traced from the adjustable tap on the resistor R21 through the base emitter circuit of the transistor TR15, the switch SW5 (assumed to be closed for present purposes) and a lower portion of the resistor R23 to the negative terminal N. Inasmuch as the transistor TR15 now is in conductive condition, current flows from the positive terminal PF through the resistor R41, the collector-emitter circuit of the transistor TR15, the switch SW5 and the lower portion of the resistor R23 to the negative terminal N. The lower part of the resistor R23 is assumed to have a much lower resistance than that of the resistor R5B. Its action is such that the voltage across the base-emitter of the transistor TR3 is dropped sufficiently to turn off the transistor. The capacitor C4 now starts to charge through the resistor R5B in accordance with the voltage VF1 across the resistor R23.

The increased current through the lower part of the resistor R23 may be substantially eliminated through opening of the switch SW5.

The opening of the switch SW5 places the base-emitter circuit of a transistor TR16 in series with the base-emitter circuit of the transistor TR15. The transistor TR16 is shown to be of the PNP type. Inasmuch as the base-emitter circuits of the two transistors are in series the two transistors turn on at the same time.

When the voltage across the lower portion of a resistor R21 exceeds that across the lower portion of the resistor R23 current flows from the tap on the resistor R21 through the base-emitter circuit of the transistor TR15, the emitter-base circuit of the transistor TR16 and the lower part of the resistor R23 to the negative terminal N. In turning on, the two transistors establish a path of current from the positive terminal PF through the resistor R41, the collector-emitter circuit of the transistor TR15, the emitter-collector circuit of the transistor TR16 and the resistor R43 to the negative terminal N. Inasmuch as the resistor R43 has a low resistance value compared to that of the resistor R5B, the transistor TR3 now turns off to permit charging of the capacitor C4 in the manner previously described.

As the capacitor C4 charges, the transistor TR9 compares the voltage across the capacitor with the difference between the voltages VF1 and VH. In other words, the voltage across the capacitor C4 is compared to a voltage corresponding to the curve ED1 of FIGURE 7.

Inasmuch as the voltage VF1 is larger than the voltage VH, the difference between these voltages biases the transistor TR9 in its blocking direction. The control circuit for the transistor TR9 may be traced from the positive terminal PF through the capacitor C4, the base-emitter circuit of the transistor TR9, a resistor R45 and the resistor R21 to the negative terminal N.

As the voltage across the capacitor C4 increases, it finally reaches a threshold or reference value at which it equals the difference between the voltages VF1 and VH. Any further increases in the voltage across the capacitor C4 produces a current flow through the emitter-base circuit of the transistor TR9 to turn on the transistor. The turning on of the transistor trips the circuit breaker CB in the manner discussed with reference to FIGURE 5, Thus, in FIGURE 8 the capacitor C4 is charged from a source having a voltage VF1 which is substantially constant over a substantial range. The voltage across the capacitor is compared with a voltage corresponding to the voltage represented by the curve ED1 in FIG. 7 which decreases as the line current increases. This results in an inverse time characteristic of the relay device.

Although the invention has been described with reference to certain specific embodiments thereof numerous modifications falling within the spirit and scope of the invention are possible.

I claim as my invention:

1. In a time-delay protective relay a saturating transformer designed for energization by an alternating-current input of a first frequency, said transformer having a saturable magnetic core designed to saturate within the rated range of energization thereof to produce an output having an alternating-current component of a second frequency, a capacitor for storing a charge, means responsive to appearance of said alternating-current component for initiating the charging of the capacitor to store energy therein, and translating means responsive to a predetermined voltage appearing across said capacitor.

2. In a time-delay protective relay, a saturating transformer designed for energization by an alternating-current input of a first frequency, said transformer having a saturable magnetic core designed to saturate within the rated range of energization thereof to produce an output having an alternating-current component of a second frequency, a capacitor for storing a charge, means for segregating said alternating-current component, rectifier means for rectifying said segregated alternating-current component to charge said capacitor, and translating means responsive to the voltage appearing across said capacitor.

3. In a time-delay protective relay, a saturating transformer designed for energization by an alternating-current input of a first frequency, said transformer having a saturable magnetic core designed to saturate within the rated range of energization thereof to produce an output having an alternating-current component of a second frequency, a capacitor for storing a charge, a source of direct current for charging said capacitor, a controllable gate, coupling means coupling said gate to the transformer to be controlled by said alternating-current component, said gate being coupled to the source and the capacitor to control the coupling of said source of direct current to the capacitor in dependence on said alternating-current component, and translating means responsive to the voltage across said capacitor.

4. In a time-delay protective relay, a saturating transformer designed for energization by an alternating-current input of a first frequency, said transformer having a saturable magnetic core designed to saturate within the rated range of energization thereof to produce an output having an alternating-current component of a second frequency, a capacitor for storing a charge, means responsive to appearance of said alternating-current component for initiating the charging of the capacitor to store energy therein, discharge means responsive to partial discharge of said capacitor for establishing a low-resistance discharge path across said capacitor until said capacitor is substantially discharged, and translating means responsive to a predetermined voltage appearing across said capacitor.

5. In a time-delay protective relay, input terminals for connecting the relay for energization from an electrical system, a capacitor for storing a charge, reference means connected for energization from said input terminals in accordance with energization of the terminals, said reference means having a threshold value of energization at which it changes substantially in impedance, said reference means maintaining a substantially constant voltage thereacross for energizations over a substantial range above the threshold value, means responsive to said change in impedance for initiating a charging of the capacitor, translating means, and means responsive to a predetermined relation between the constant voltage and the voltage across said capacitor for operating said translating means.

6. In a time-delay protective relay, a capacitor, a controllable switch connected when close across said capacitor to provide a discharge path for any charge in the capacitor, and control means responsive to an increase in current supplied to the capacitor and switch when closed in parallel for opening said switch to permit charging of the capacitor, said control means being responsive to an increase in current supplied from the capacitor when the switch is open for closing the switch to discharge the capacitor rapidly.

7. In a time-delay protective relay, input terminals, a capacitor, a transformer having a primary winding and a secondary winding, means connecting the capacitor to the input terminals through the primary winding to receive a charge, translating means connected for energization from a charge stored in the capacitor through the primary winding, a controllable switch connected across the capacitor to provide a discharge path for the capacitor, and means connecting the switch to be controlled by current flowing in the secondary winding to open the switch when current supplied by the input terminals to the capacitor and switch increases and to close the switch when current supplied from the capacitor to the translating means increases.

8. In a time-delay protective relay, input terminals, a capacitor, a transformer having a primary winding and a secondary winding, means connecting the capacitor to the input terminals through the primary winding to receive a charge, translating means connected for energization from a charge stored in the capacitor through the primary winding, a transistor having its emitter and collector connected respectively to the terminals of the capacitor to provide a controllable discharge path for the capacitor, and means connecting the emitter and base of the transistor for energization by the secondary winding to turn the transistor off when current flowing from the input terminals to the capacitor increases and to turn the transistor on when current flowing from the capacitor to the translating means increases.

9. In a time-delay protective relay, a first source of voltage substantially subject to variation over a range of a condition, a second source of voltage substantially constant over said range, a capacitor, means responsive to a predetermined condition for initiating the charging of the capacitor from said second source, and translating means responsive to the difference between the voltage across said capacitor and the voltage of said first source.

10. In a time-delay protective relay, input terminals adapted for receiving energy from an electrical system to be protected, means for deriving from said terminals when energized a first voltage which varies over a range of variation of the energization of the input terminals, means for deriving from said terminals a second voltage which is substantially constant over said range, means responsive to a predetermined condition for charging the capacitor from the second voltage, and translating means responsive to the difference between the voltage across the capacitor and the first voltage.

11. In a time-delay protective relay, a saturating transformer designed for energization by an alternating-current input of a first frequency, said transformer having a saturable magnetic core designed to saturate within the rated range of energization thereof to produce an out having an alternating-current component of a second frequency, a capacitor for storing a charge, means for segregating said alternating-current component, rectifier means for rectifying said segregated alternating-current component and supplying the rectified component to charge said capacitor, and translating means responsive to the difference between the voltage across the capacitor and a direct voltage corresponding to the alternating-current output of said transformer of said first frequency.

References Cited by the Examiner

UNITED STATES PATENTS

| | | | |
|---|---|---|---|
| 1,286,815 | 12/18 | Smith | 317—36 |
| 2,210,669 | 8/40 | Johnson | 317—36 |
| 3,133,230 | 5/64 | Glassburn | 317—36 |
| 3,144,568 | 8/64 | Silliman et al. | 317—142 X |
| 3,155,879 | 11/64 | Casey et al. | 317—36 X |

SAMUEL BERNSTEIN, *Primary Examiner.*